Patented Dec. 12, 1950

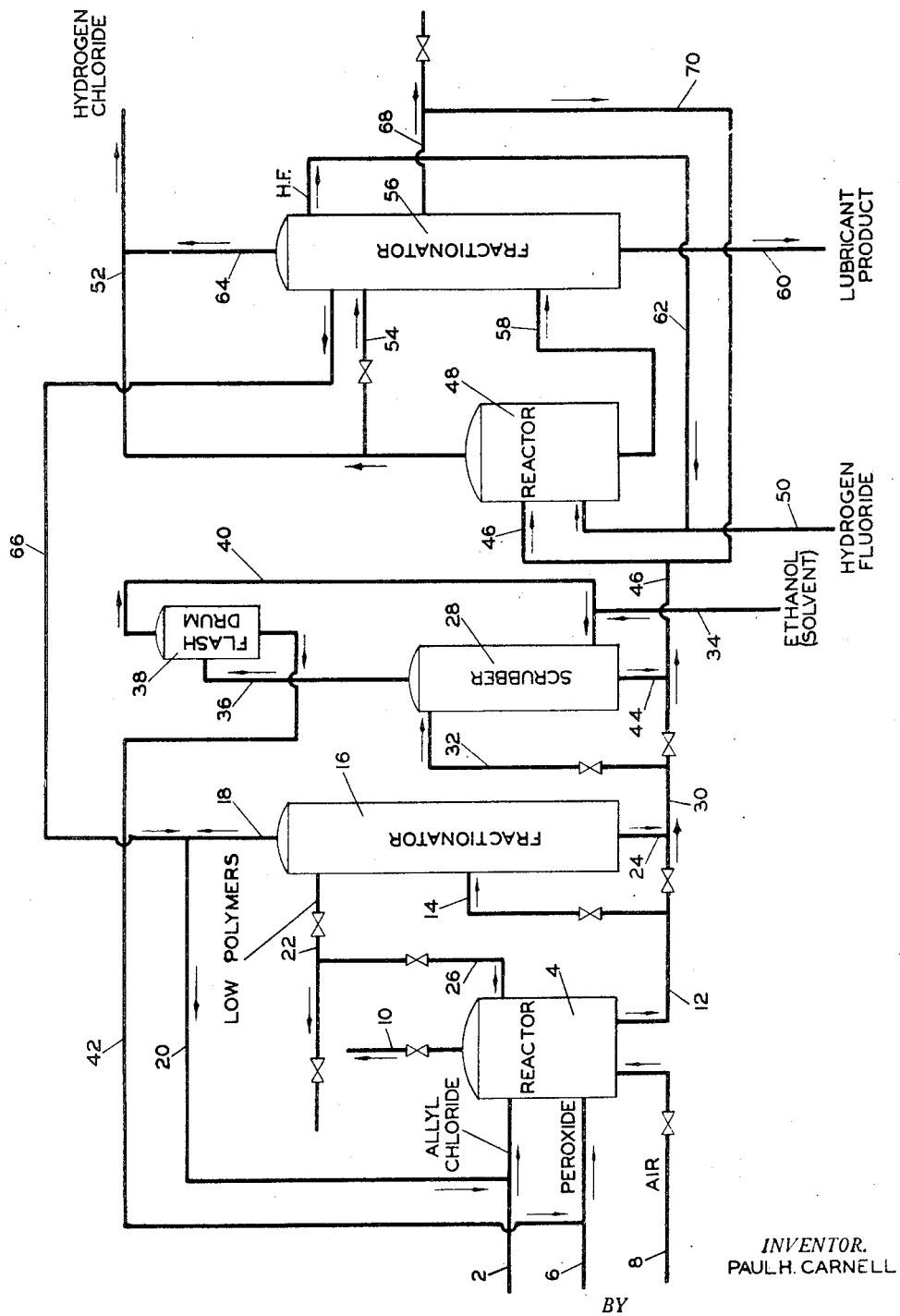

2,533,425

UNITED STATES PATENT OFFICE

2,533,425

POLYMERIZATION OF ALLYL CHLORIDE AND METHOD OF USING THE PRODUCT AS A VALVE LUBRICANT

Paul H. Carnell, Bartlesville, Okla., assignor to Phillips Petroleum Company, a corporation of Delaware Application May 14, 1946, Serial No. 669,520

6 Claims. (Cl. 251—93)

This invention relates to polymers and their production. In one embodiment it relates to the formation of polymers of allyl chloride suitable as lubricants. In another embodiment this invention relates to a method of employing such lubricants and to a novel method of lubricating valves. Specific features of the invention involve the formation and use of polymers containing combined chlorine and fluorine which are highly resistant to the action of liquid hydrocarbons and of aqueous acids.

In many industrial plants today, strong mineral acids are employed as reactants, treating agents, or catalysts. The serious problems encountered are so well known as hardly to require recitation. The most important, of course, are problems caused by the corrosive nature of the acids, and are overcome only by careful selection of materials of construction and methods of equipment fabrication, and addition of inhibiting agents to the acids. Numerous valves, pumps, and other items having moving parts are essentials in such a plant set-up. A host of materials have been suggested and tried as lubricants in such acid service, but without complete success being realized. Lubricants having proper viscosity and oiliness are subject to chemical attack by the acid, while materials which resist attack are deficient in one or more of the necessary qualities of a good lubricant.

Within the last few years, hydrogen fluoride has developed from little more than a mere laboratory curiosity into an industrial chemical of the first importance. This has been due primarily, though by no means exclusively, to the recognition of its remarkable catalytic properties in a number of organic reactions. The most important commercially at this time is the use of concentrated hydrogen fluoride to catalyze the reaction of low-boiling isoparaffins, such as isobutane and isopentane, with olefins to produce isoparaffinic motor fuels of high antiknock value. The alkylate so produced was used during the recent war in literally millions of gallons of aviation fuel as the principal high antiknock fuel component thereof. In the HF alkylation plants are to be found streams of concentrated acid, of liquid hydrocarbons, of dilute aqueous acid, and mixtures of acid and hydrocarbons. The numerous valves and pumps in HF alkylation plants have been lubricated with many different compositions offered in the trade for this purpose, and with various compositions worked out by the laboratory and plant workers. None of these, however, has been found fully adequate in eliminating attack by acid and/or solution in hydrocarbons and many are so poor as to be hardly worth using.

Another process involving use of hydrofluoric acid which has important commercial possibilities is the hydration of olefins to form the corresponding alcohols, through the action of aqueous hydrogen fluoride. As described in the copending application of F. E. Frey, Serial No. 521,833, filed February 10, 1944, now Patent Number 2,484,702, aqueous HF solutions having an acid concentration of 40 to 50 per cent are generally preferred, and reaction temperature ranges from 0 to 300° C. While aqueous HF generally does not attack most lubricants as severely as concentrated or substantially anhydrous acid, it has still been difficult to find greases suitable for use in contact with the weaker acid, as one or more components of the grease are dissolved out, or the grease deteriorates by forming lumps, sticking, or disintegrating. The same is true of aqueous solutions of hydrochloric acid, used in many well known industrial processes.

It is an object of this invention to produce lubricants suitable for use in contact with aqueous mineral acids and/or liquid or gaseous hydrocarbons. Another object is to provide polymers suitable for such use. A further object is to polymerize allyl halides. A still further object is to produce fluorine-containing polymers. Yet another object is to subject allyl chloride or its homologs to a dual polymerizing treatment whereby highly insoluble viscous polymers of a lubricating consistency are formed. A further object is to produce a valve grease of satisfactory fluidity for forcing into a valve, but which during use in contact with liquid hydrocarbons is increased in viscosity to the degree requisite for non-sticking lubrication over a long period of time. A further object of this invention is to employ lubricants so produced and to provide a novel method of lubricating valves. Other objects and advantages of the invention will be apparent, to one skilled in the art, from the accompanying disclosure and discussion.

While polymers of various organic materials have heretofore been suggested for use as lubricants, and the properties of such polymers have in some instances been adequate for given applications, no lubricant of any kind, whether polymeric or otherwise, has been found entirely suitable for uses in which contact with acid and hydrocarbons is involved. I have found, however, that if an allyl halide, preferably allyl chloride, be subjected to the polymerizing steps described below, a polymer is produced which is very satisfactory for such purposes. First, the allyl chloride is treated with free oxygen and/or other oxidizing agents such for example as nitrogen oxides or organic peroxides to effect what is apparently a preliminary partial polymerization in which at least part of the monomer is converted into polymers. The total treated material, or the polymer content thereof, is next subjected to reaction in the presence of substantial amounts of concentrated hydrogen fluoride, which apparently acts both as a polymerization catalyst and as a reactant. The resulting viscous polymer, which contains both chlorine and fluorine in combined form, is the desired product.

The first step of the process may utilize any gas containing free oxygen, such as air, or one or more organic peroxides, such as benzoyl peroxide or acetyl peroxide, or both oxygen and peroxide. Best results appear to result from the combined use of air and benzoyl peroxide. The amount of peroxide required may vary from 0.5 per cent by weight of the allyl chloride up to 50 per cent or even more, depending on the other reaction conditions. The reaction conditions may vary over a wide range, but moderate temperatures such as 0 to 50° C. and moderate pressures such as atmospheric or near-atmospheric, are preferred. At short reaction times a relatively large amount of peroxide and/or air must be used, whereas the amounts of these agents may be cut down substantially if a long reaction time is economically feasible. The resistance of the ultimate polymeric material to the action of liquid hydrocarbon solvents, such as gasoline, appears to be dependent upon the severity of this first step of the process. A mild treatment is insufficient to give the desired results and accordingly the amount of peroxide, air, temperature and/or reaction time must be sufficiently great to result in a final product resistant to the solvent action of liquid hydrocarbons. On the other hand, a less severe treatment is adequate where only resistance to aqueous acids is desired of the lubricant product.

Effluents of the first step may be treated for recovery of excess peroxide if desired, or they may be passed directly to the second stage. Unreacted allyl chloride may first be separated and recycled to the first stage treatment. Likewise, some of the lower molecular weight polymers may be distilled off and only the heavier material passed to the second stage. Concentrated hydrogen fluoride is admixed in the second stage with the pre-treated allyl chloride material. Commercial anhydrous hydrogen fluoride is probably the most satisfactory, although any hydrogen fluoride having a concentration of approximately 85 or 90 per cent or higher is effective. The second stage reactions may be carried out at elevated temperatures and pressures, but it is preferred to use temperatures of from 0 to 50° C. and approximately atmospheric pressure. Reaction may be continued for a length of time sufficient to give a lubricant of the desired viscosity, the longer the treatment the more viscous the product. This control of reaction time enables various acid-resistant and hydrocarbon-resistant lubricants to be prepared for a wide variety of uses. Elevated temperatures likewise tend to produce a more viscous product.

Hydrogen fluoride acts as a polymerization catalyst in the second stage, and in addition a substantial amount of hydrogen fluoride enters into chemical combination to give a product containing combined fluorine as well as combined chlorine. Hydrogen chloride is liberated by the reaction so that the product contains less chlorine than would be the case if it were a simple polymer of allyl chloride. The hydrogen chloride may advantageously be withdrawn from the reaction as formed. Effluents from the second stage reaction are treated to remove any excess hydrogen fluoride, hydrogen chloride and unpolymerized allyl chloride. This is readily accomplished by a simple heating and/or reduction in pressure. The lower boiling components of the polymer may likewise be removed by distillation.

The accompanying drawing represents in diagrammatic form one arrangement of apparatus elements and flow of material therethrough suitable for the practice of my invention. No attempt has been made to show all the details of auxiliary equipment such as valves, heating and cooling means, pumps, control elements or the like as these may readily be supplied by one skilled in the art. It will be obvious that various modifications may be made without departing from the invention.

In the drawing, allyl chloride is introduced via line 2 into reactor 4. An organic peroxide, such as benzoyl peroxide, may be introduced from line 6, while air or other oxygen-containing gas may be introduced from line 8. This gas may, if desired, be allowed to bubble up through the liquid reaction mixture in reactor 4, and line 10 is provided for continuous or intermittent withdrawal of excess air. Suitable means for vigorously agitating the reaction mixture are provided; in some instances the passage of air will be sufficient to accomplish this. Reactor 4 may be operated continuously or by batches. The partially polymerized material is withdrawn through line 12 and may be passed via line 14 into fractionator 16, which is provided with bubble caps or packing, or which may be a simple flash chamber. Part or all of the unreacted allyl chloride is withdrawn overhead through line 18 and recycled via lines 20 and 2 to reactor 4. Likewise, the polymer may be topped so that some of the lower boiling polymer components are withdrawn, as through line 22, and the heavier unvaporized material is withdrawn from unit 16 through line 24. If any low boiling polymeric material is separated at this point, it may be recycled to reactor 4 via lines 22 and 26.

If a substantial amount of benzoyl peroxide or other peroxide still remains in uncombined form, it may be recovered in any suitable manner in unit 28. By the method shown in the drawing, total effluent of reactor 4 from line 12, or the bottom product of fractionator 16 from line 24, is passed via lines 30 and 32 into the top of unit 28 which is packed with suitable material for encouraging liquid-liquid contact. Into the bottom of scrubber 28 is introduced ethanol from line 34. The ethanol passes countercurrently to the allyl chloride material in scrubber 28 and extracts benzoyl peroxide therefrom. The rich ethanol solvent is withdrawn through line 36 and passes into evaporator 38 in which the ethanol is separated from the benzoyl peroxide. The former is returned via line 40 for reuse in scrubber 28, while the peroxide is passed through lines 42 and 6 to reactor 4. Peroxide-free material is recovered from scrubber 28 by way of line 44.

The thus-pretreated allyl chloride which has been partially polymerized is passed from line 30 or line 44 via line 46 into the second stage reactor 48, wherein it is admixed with concentrated hydrogen fluoride entering from line 50. Stirring or other agitating means (not shown) are preferably provided within reactor 48. The reactor is allowed to proceed until a product of desired viscosity is obtained. Liberated hydrogen chloride may be withdrawn continuously or intermittently through line 52. Hydrogen fluoride carried by this gaseous stream may be refluxed back into reactor 48 by means not shown, or the mixture of HCl and HF may be passed through line 54 into fractionator 56 for separation of the two hydrogen halides, one from the other. The total reaction mixture is withdrawn from reactor 58 and passed into fractionator 56. In this unit, which may be constructed in any suitable manner known to the art, any remaining hydrogen fluoride and hydrogen chloride are separated overhead from the viscous polymer product which is recovered through line 60. It may be mentioned here that a substantial excess of hydrogen fluoride is preferably used in reactor 48 over the quantity required to act as catalyst and reactant therein. The excess HF is withdrawn from fractionator 56 via line 62 for recycle to the reactor 48. Any HCl present in the liquid reactor effluents is taken off as an overhead product of fractionator 56 through line 64. The HCl produced in this process may be utilized as a starting material in the manufacture of allyl chloride by any of the known methods, so that none of the chlorine content of the allyl chloride is wasted. There may still be a substantial amount of unpolymerized allyl chloride present after the second stage reaction and this may be separated in fractionator 56 and returned via lines 66 and 20 to the first reactor 4. The total polymer product may be withdrawn through line 60 for use as a lubricant resistant to aqueous acids and to liquid hydrocarbons; or, some of the light fractions of the polymer may be separated off and withdrawn through line 68, or returned through lines 70 and 46 to the second stage reactor 48, and only the heavier fractions used as lubricant.

The following data are presented in order to illustrate some of the preferred methods of preparing lubricants in accordance with the invention, and to show certain properties of polymers produced under varying reaction conditions. It will be obvious that these examples are not exhaustive of the broad scope of the invention.

*Example I*

A sample of fresh allyl chloride was placed in a Monel beaker and an approximately equal volume of commercial anhydrous hydrofluoric acid was added to the halide. The reaction proceeded rapidly at room temperature. The reactants were allowed to stand for several hours while the acid evaporated off. The mixture was then heated to about 100° C. to remove hydrofluoric acid, hydrogen chloride, and unreacted allyl chloride. The product was a viscous oil. This polymer was appreciably soluble in isooctane, and concentrated hydrofluoric acid dissolved in it readily.

*Example II*

A sample of allyl chloride which had been standing exposed to air for several months was polymerized. This material had a substantial peroxide content. Into a 500-ml. Monel beaker at room temperature were placed 150 g. of the allyl chloride and 150 g. of commercial anhydrous HF. Reaction began immediately and appeared to proceed more rapidly when the mixture was stirred. The reaction mixture was allowed to stand for about one hour at room temperature while HF boiled off. The reaction appeared to have ceased then, and the beaker was heated to about 100° C. on a hot plate to remove HF, HCl, and unreacted allyl chloride. Polymer yield was about 50%. The product, which was a black viscous oil, was tested for solubility in various liquids as follows:

| Testing Agent (Excess) | Contact Time, hours | Appearance at End of Contact Time |
|---|---|---|
| Isooctane | 24 | Very slight coloring of isooctane; polymer unchanged. |
| 50% Hydrofluoric acid | 24 | Unchanged. |
| 38% Hydrochloric Acid | 24 | Do. |
| Water | 24 | Do. |
| Methanol | 24 | Very slight coloring of methanol; polymer unchanged. |

The slight coloring of the methanol and isooctane shown by these tests was probably produced by the dissolving of some allyl chloride which was not in as high a state of polymerization as the greater portion of the product.

A commercial grease which is recommended for use in contact with hydrocarbon solvents was tested as follows:

| Testing Agent (Excess) | Contact Time, hours | Appearance at End of Contact Time |
|---|---|---|
| Isooctane | 24 | Unchanged. |
| 50% Hydrofluoric Acid | 0.25 | Dissolved. |
| 38% Hydrochloric Acid | 0.75 | Do. |
| Water | 0.25 | Flaked and dissolved. |
| Methanol | 0.25 | Hardened and dissolved. |

*Example III*

The following runs were made to investigate the effect of the reaction of benzoyl peroxide with fresh allyl chloride on the hydrocarbon solubility of the polymer obtained by the polymerization of the peroxide-treated allyl chloride in the presence of anhydrous hydrofluoric acid.

| Run | 1 | 2 | 3 | 4 | 5 | 6 | 7 | 8 |
|---|---|---|---|---|---|---|---|---|
| Allyl chloride, g | 200 | 200 | 100 | 100 | 100 | 100 | 100 | 50 |
| Benzoyl peroxide, g | 1 | 1 | 2 | 5 | 20 | 20 | 50 | 50 |
| Method of Contact | Monel bomb on rocker. | Monel bomb on rocker. | reflux | reflux | reflux | reflux | reflux | reflux. |
| Approximate maximum temp., °C | 54 | 125 | 45 | 45 | 45 | 45 | 45 | 45 |
| Contact time, hours | 0.4 | 2 | 27 | 7 | 4 | 9 | 4 | 4 |
| Solubility of HF polymer in isooctane [1]. | appreciable. | appreciable. | appreciable. | appreciable. | slightly soluble.[2] | slightly soluble.[2] | very slightly soluble.[2] | very slightly soluble. |

[1] The peroxide-treated allyl chloride was polymerized with concentrated hydrofluoric acid as previously described.
[2] In runs 5, 6, and 7, the peroxide-treated allyl chloride was distilled from a one-plate column until about one-half of the kettle charge was distilled over. The hydrocarbon solubility of the polymer obtained by the HF polymerization of the kettle product is reported. (The HF polymers of the distillates were all appreciably soluble in isooctane.)

Example IV

Five gallons of allyl chloride were exposed to air for a total period of two weeks. Two hundred grams of benzoyl peroxide were added in two additions of one hundred grams each. After each addition air was bubbled through the allyl chloride plus benzoyl peroxide intermittently for eighteen hours. The total material was then allowed to stand exposed to air.

Polymerization of the thus-treated material was effected by the addition in excess of anhydrous hydrofluoric acid. Resulting polymer was heated to remove unreacted hydrogen fluoride, then water-washed. This material, which had been allowed to stand for approximately four weeks before analysis, was found to contain 35.3 weight per cent chlorine and 14.8 weight per cent fluorine. This material was not resistant to anhydrous hydrogen fluoride, but was insoluble in isooctane.

Example V

Approximately 14,000 grams of fresh allyl chloride was placed in a five-gallon bottle outdoors, exposed to sunlight and air. To the initial charge was added 90 grams of benzoyl peroxide. Samples were taken at intervals, subjected to polymerization in the presence of excess concentrated HF, and the resulting polymer tested for hydrocarbon solubility. History of the experiment and results, follow:

| Days elapsed from start | |
|---|---|
| 0 | Experiment commenced. Sample taken and HF polymer prepared. Polymer soluble in isooctane. |
| 1 | 10 grams of benzoyl peroxide added to allyl chloride. |
| 2 | Sample taken and HF polymer prepared. Polymer soluble in isooctane. |
| 2 | Slow stream of air passed through allyl chloride by means of fritted disc at bottom of bottle. |
| 5 | Sample taken and HF polymer prepared. Polymer soluble in isooctane. |
| 5 | Additional 80 g. of benzoyl peroxide added to allyl chloride. |
| 8 | Sample taken and HF polymer prepared. Polymer appreciably soluble in alpha reference fuel. |
| 12 | Sample taken and HF polymer prepared. Polymer less soluble in alpha reference fuel than previous samples. |
| 13 | Slow stream of air passed through allyl chloride for one hour. |
| 14 | Slow stream of air passed through allyl chloride for one hour. |
| 20 | Sample taken and distilled. About one-half of the kettle charge was distilled over from a one-plate distilling flask. Kettle product and distillate were each polymerized with HF; distillate polymer quite soluble in alpha reference fuel; kettle polymer only slightly soluble in alpha reference fuel. |
| 21 | Slow stream of air passed into the sample for 8 hours. |
| 26 | 500-ml. sample distilled in a 5-foot glass fractionating column packed with 3/32-inch Fenske rings. After about 363-ml. distilled over at 43 to 45° C. (109 to 113° F.), the material remaining in the kettle turned dark and polymerized. The HF polymer was insoluble in alpha reference fuel after 50 hours contact. |
| 27 | Remaining allyl chloride from 5-gal. bottle poured into the original steel container. Allowed to stand for two days. |
| 30 | Allyl chloride removed from steel container. Entire sample had turned from pale yellow to dark brown, indicating polymerization. Material still quite fluid. |
| 30 | In an effort to further polymerize the partially polymerized allyl chloride, the entire sample was refluxed for 6½ hours. Product still quite fluid at the end of refluxing time. |
| 31 | Partially polymerized allyl chloride further refluxed for 9 hours. Product still quite fluid. |
| 33 | Additional 100 g. of benzoyl peroxide added to partially polymerized allyl chloride and the mixture refluxed for 8 hours. Product still quite fluid. |
| 34 | Partially polymerized allyl chloride treated with excess HF. Product polymer was viscous and highly insoluble in isooctane. |

As pointed out hereinabove, the total allyl chloride which has been subjected to oxidative polymerization with free oxygen, peroxides, or other oxidation agents, or a heavy fraction of the thus-treated material, may be polymerized with hydrogen fluoride, and all or a fraction of the product may be utilized as lubricant. Various fillers and additives may be mixed with the lubricant to produce a material having the desired consistency for a given application. Thus graphite, being insoluble in both hydrocarbons and acids, as well as having lubricant properties of its own, is eminently suitable for incorporation into an HF-allyl chloride polymer lubricant composition intended for use in plug valves in acid-hydrocarbon service. The amount of graphite or other additive used is of course dependent on the viscosity of the polymer and the desired viscosity of the product. In lubricants to be used in contact with acids there may be incorporated highly halogenated organic compounds, such as naphthalene tetrachloride, benzene hexachloride, benzene hexabromide, hexachlorobenzene, and the like, which add body and increase the viscosity of the lubricant mixture. These halogenated materials are also fairly resistant to solution in hydrocarbons.

When certain types of valves are to be lubricated with viscous allyl halide polymers, difficulty is encountered in obtaining as complete lubrication as is desired because of the failure of lubricant to flow sufficiently to fill the lubricating grooves in the valve. Once the viscous polymer is forced into place, however, it loses a certain amount of its tackiness and has a greater lubricity apparently because of the solution of a small amount of HF in the lubricant.

A particularly effective method of lubricating such valves or other surfaces with the more viscous and tacky polymers of this invention is to admix same with a material which imparts greater lubricity, which preferably does not react with the polymers, which preferably does not react with the fluids which are to come into contact with the grease, such as acids, alcohols or hydrocarbons, but which is soluble in such fluids. Although other materials may be used, chlorinated organic liquids or oils are preferred. Examples are: chlorinated paraffin wax, hexachlorobutadiene, lauryl chloride, hexachloropropylene, tetrachloroethylene, etc. The amount of chlorinated organic liquid or oil added to the polymer may vary considerably and is dependent on the viscosity of the chlorinated organic oil or liquid added, the viscosity of the polymer, and the desired application of the lubricant.

Addition of these materials to the HF-polymerized allyl chloride produces lubricants of somewhat decreased viscosity and greater lubricity. Since these lubricants flow relatively easily, they are more readily charged to the system and, for particular applications, such as the lubrication of plug valves in HF-olefin hydration units, are more efficient in reaching all parts of the valve requiring lubrication. The chlorinated organic liquid or oil added to the allyl chloride polymer, is dissolved out by continuous contact with the HF, hydrocarbon, or alcohol of the system. A small amount of HF from the system dissolves in the polymerized allyl chloride and the lubricant thereby acquires a high lubricity, as the polymer seems to lose some of its tackiness on contact with HF.

Allyl chloride is the preferred reactant for the present invention, in view of its high reactivity, relative cost, and availability. However, the other allyl halides, particularly the bromide and iodide, may be used, and the resulting products may be preferred for specific applications. The homologs of the allyl halides, especially 2-methyl allyl chloride, are suitable starting materials, but their use is seldom economically justified. Various modifications of the invention may be practiced without departing from the spirit and scope of the appended claims.

I claim:

1. The method of lubricating a plug valve through which liquid hydrocarbons flow, which comprises forcing into the lubricating grooves of the valve a mixture of a viscous tacky hydrocarbon-insoluble polymer of allyl chloride containing combined chlorine and fluorine and which is too viscous for ready passage into said lubricating grooves admixed with sufficient of a less-viscous hydrocarbon-soluble halogen-containing organic material as to produce a free-flowing mixture, and flowing said liquid hydrocarbons through said valve whereby said added halogen-containing organic material is dissolved and carried away from the valve and said viscous polymer remains in said valve as lubricant.

2. The method of lubricating a valve through which a liquid flows, with an insoluble lubricant too viscous for ready passage into the valve, which comprises forcing into said valve to lubricate same a mixture of an insoluble lubricant too viscous for ready passage into the valve in admixture with sufficient of a viscosity-reducing material which is soluble in said liquid flowing through the valve as to produce a free-flowing mixture, and flowing said liquid through said valve whereby said soluble viscosity-reducing material is dissolved and carried away from the valve and said insoluble viscous lubricant remains.

3. The method of preparing a lubricant which comprises partially polymerizing allyl chloride in the presence of from 0.5 to 50 weight per cent benzoyl peroxide and air at a temperature within the range of 0 to 50° C. for a time sufficient to produce a final polymer resistant to the action of aqueous acids, separating unpolymerized allyl chloride from polymer thus produced, further treating the latter in the presence of a polymerizing agent consisting of concentrated hydrogen fluoride to produce a final viscous polymer containing combined chlorine and fluorine, and recovering said final viscous polymer as a product of the process.

4. The method of preparing a lubricant which consists of partially polymerizing allyl chloride in the presence of 0.5 to 50 weight per cent benzoyl peroxide and air at a temperature within the range of 0 to 50° C., said benzoyl peroxide concentration and temperature being correlated with reaction time to produce a final polymeric material insoluble in liquid hydrocarbons, separating unpolymerized allyl chloride from polymer thus produced, further treating the latter in the presence of a polymerizing agent consisting of concentrated hydrogen fluoride, and recovering a heavy viscous polymeric material containing combined chlorine and fluorine.

5. A lubricant comprising as an essential lubricating constituent thereof a viscous polymeric material prepared by subjecting allyl chloride first to the combined action of from 0.5 to 50 weight per cent of an organic peroxide and air at a temperature of 0 to 50° C. and for a time sufficient to produce a final polymer resistant to the action of aqueous acids and then to reaction with a polymerizing agent consisting of concentrated hydrogen fluoride to effect elision of hydrogen chloride and addition of hydrogen fluoride.

6. A lubricant comprising as an essential lubricating constituent thereof a viscous polymeric material prepared by subjecting allyl chloride first to the combined action of more than 5.0 but not more than 50 weight per cent of an organic peroxide and air at a temperature of 0 to 50° C. and for a time sufficient to produce a final polymer resistant to the action of aqueous acids and liquid hydrocarbons and then to reaction with a polymerizing agent consisting of concentrated hydrogen fluoride to effect elision of hydrogen chloride and addition of hydrogen fluoride.

PAUL H. CARNELL.

REFERENCES CITED

The following references are of record in the file of this patent:

UNITED STATES PATENTS

| Number | Name | Date |
| --- | --- | --- |
| 1,714,184 | Moore | May 21, 1929 |
| 2,119,552 | MacLaren | June 7, 1938 |
| 2,129,289 | Soll | Sept. 6, 1938 |
| 2,186,916 | Wiezevich | Jan. 9, 1940 |
| 2,338,893 | Bauer | Jan. 11, 1944 |